(12) United States Patent
Chien et al.

(10) Patent No.: US 11,082,415 B2
(45) Date of Patent: Aug. 3, 2021

(54) ANONYMOUS SOCIAL COMMUNICATIONS

(71) Applicants: AT&T Intellectual Property I, L.P., Atlanta, GA (US); AT&T Mobility II LLC, Atlanta, GA (US)

(72) Inventors: Ginger Chien, Bellevue, WA (US); Yehoshuva Arasavelli, Redmond, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 110 days.

(21) Appl. No.: 15/946,814

(22) Filed: Apr. 6, 2018

(65) Prior Publication Data

US 2018/0227287 A1    Aug. 9, 2018

Related U.S. Application Data

(60) Continuation of application No. 15/005,040, filed on Jan. 25, 2016, now Pat. No. 9,961,064, which is a
(Continued)

(51) Int. Cl.
| | |
|---|---|
| *H04L 29/00* | (2006.01) |
| *H04L 29/06* | (2006.01) |
| *H04W 76/14* | (2018.01) |
| *H04W 76/11* | (2018.01) |
| *H04W 12/06* | (2021.01) |

(Continued)

(52) U.S. Cl.
CPC .......... *H04L 63/08* (2013.01); *H04L 63/0407* (2013.01); *H04W 12/06* (2013.01); *H04W 76/11* (2018.02); *H04W 76/14* (2018.02); *H04W 12/02* (2013.01); *H04W 84/005* (2013.01); *H04W 84/18* (2013.01)

(58) Field of Classification Search
CPC ........ H04L 63/08; H04W 76/14; H04W 76/11
USPC .......................................................... 726/7
See application file for complete search history.

(56) References Cited

U.S. PATENT DOCUMENTS

| | | | |
|---|---|---|---|
| 6,880,079 B2 | 4/2005 | Kefford | |
| 7,136,368 B2 | 11/2006 | Inoue | |

(Continued)

FOREIGN PATENT DOCUMENTS

| | | | |
|---|---|---|---|
| CN | 101394630 B | * | 5/2012 |
| JP | 2010141890 | | 6/2010 |

(Continued)

OTHER PUBLICATIONS

Morris, Robert, et al. "CarNet: A scalable ad hoc wireless network system." Proceedings of the 9th workshop on ACM SIGOPS European workshop: beyond the PC: new challenges for the operating system, ACM, 2000, 5 pages.

(Continued)

*Primary Examiner* — Morshed Mehedi
*Assistant Examiner* — Michael D Anderson
(74) *Attorney, Agent, or Firm* — Guntin & Gust, PLC; Kenneth S. Kwan

(57) ABSTRACT

An anonymous or ad hoc communication is established between unknown contacts. For example, in today's mobile communications environment, there are many instances in which a user of smart phone may wish to send a message to an unknown user's smartphone. The anonymous or ad hoc communication thus allows messaging with an unknown user.

20 Claims, 5 Drawing Sheets

Related U.S. Application Data division of application No. 14/086,873, filed on Nov. 21, 2013, now Pat. No. 9,277,573.

(51) Int. Cl.
*H04W 84/00* (2009.01)
*H04W 84/18* (2009.01)
*H04W 12/02* (2009.01)

(56) References Cited

U.S. PATENT DOCUMENTS

| | | | |
|---|---|---|---|
| 7,313,120 | B2 | 12/2007 | Ekberg et al. |
| 7,333,026 | B2 | 2/2008 | Hunzinger |
| 7,394,798 | B2 | 7/2008 | Naghian |
| 7,468,954 | B2 | 12/2008 | Sherman |
| 7,492,777 | B2 | 2/2009 | Ekberg et al. |
| 7,573,855 | B2 | 8/2009 | Hohl et al. |
| 7,590,086 | B2 | 9/2009 | Olkkonen et al. |
| 7,881,238 | B2 | 2/2011 | Krantz et al. |
| 7,889,691 | B2 | 2/2011 | Chen et al. |
| 8,159,999 | B2 | 4/2012 | Chandra et al. |
| 8,363,609 | B2 | 1/2013 | Zhang |
| 8,385,269 | B2 | 2/2013 | Haddad |
| 8,503,980 | B2 | 8/2013 | Ma et al. |
| 2002/0036991 | A1 | 3/2002 | Inoue |
| 2004/0019571 | A1 | 1/2004 | Hurwitz |
| 2004/0190468 | A1 | 9/2004 | Saijonmaa |
| 2005/0058109 | A1 | 3/2005 | Ekberg |
| 2010/0009703 | A1 * | 1/2010 | Sornay .......... H04L 51/32 455/466 |
| 2010/0262828 | A1 | 10/2010 | Brown et al. |
| 2012/0087292 | A1 | 4/2012 | Grimm et al. |
| 2012/0106429 | A1 | 5/2012 | Hong et al. |
| 2012/0182932 | A1 | 7/2012 | Amis et al. |
| 2013/0203448 | A1 | 8/2013 | Kang et al. |

FOREIGN PATENT DOCUMENTS

| | | |
|---|---|---|
| JP | 2013118499 | 6/2013 |
| KR | 20100094874 A * | 8/2010 |
| WO | WO 2005104458 | 11/2005 |
| WO | WO-2012093396 A1 * | 7/2012 .......... H04W 4/14 |

OTHER PUBLICATIONS

Li, Qun et al., "Sending messages to mobile users in disconnected ad-hoc wireless networks." Proceedings of the 6$^{th}$ annual international conference on Mobile computing and networking, ACM, 2000, 13 pages.

Balfanz, Dirk, et al. "Talking to strangers: Authentication in Ad-Hoc Wireless Networks." NDSS, 2002, 14 pages.

Hull, Bret et al. "CarTel: a distributed mobile sensor computing system." Proceedings of the 4$^{th}$ international conference on Embedded networked sensor systems, ACM, 2006, 14 pages.

Roussopoulos, Mema, et al. "Person-level Routing in the Mobile People Architecture." USENIX Symposium on Internet Technologies and Systems, 1999, 11 pages.

* cited by examiner

ANONYMOUS SOCIAL COMMUNICATIONS

CROSS-REFERENCE TO RELATED APPLICATIONS

This application is a continuation of U.S. application Ser. No. 15/005,040 filed Jan. 25, 2016 and since issued as U.S. Pat. No. 9,961,064, which is a divisional of U.S. application Ser. No. 14/086,873 filed Nov. 21, 2013 and since issued as U.S. Pat. No. 9,277,573, with both applications incorporated herein by reference in their entireties.

BACKGROUND

There are some instances when a user would like to send another user a brief message, but the user does not know contact information of the other user. In other words, the user would like to send a message to an unknown user. For example, the user may be driving on a road and sees a safety issue of another vehicle in front of the user's vehicle, e.g., something is trapped in the vehicle's door, something is falling out of the vehicle's trunk, and the like.

Currently, the only way to try and notify the unknown user about the potential safety issue is to speed up next to the vehicle, obtain the driver's attention and yell out the window. This may not be received warmly by the other driver and may in fact create a safety issue for the user who has to match the speed of the other vehicle to relay the message.

SUMMARY

In one embodiment, the present disclosure discloses a method, computer-readable storage device and apparatus for establishing an ad hoc communication with an unknown contact. For example, the method receives an authentication token from a recipient endpoint device for authentication of an unsolicited message from a sender endpoint device, wherein the recipient endpoint device is an unknown contact to the sender endpoint device and the unsolicited message is sent over an open communications protocol, authenticates the authentication token, and sends a confirmation that the authentication token is authenticated to the recipient endpoint device to allow the recipient endpoint device to establish a connection to the sender endpoint device to begin the ad hoc communication.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to establishing a communication between endpoint devices and, more particularly, to a method, computer-readable storage device and apparatus for establishing an ad hoc communication with an unknown contact. As discussed above, there are some instances when a user would like to send another user a brief message, but the user does not know the contact information of the other user. In other words, the user would like to send a message to an unknown user. For example, the user may be driving on a road and sees a safety issue of another vehicle in front of the user's vehicle, e.g., something is trapped in the vehicle's door, something is falling out of the vehicle's trunk, and the like.

One embodiment of the present disclosure provides a method, computer-readable storage device and apparatus to allow a user to establish an ad hoc communication with an unknown contact. For example, the user may be authenticated using a varying level of different authentication options and the unknown contact may then decide to either accept or deny the message. In one embodiment, the message may be created and transmitted using open short range communication protocols (e.g., Bluetooth®, Zigbee®, near field communications, other radio frequency (RF) communications, Wi-Fi, infrared communications (e.g., IrDA), and the like) and the communications network may provide an option to continue the ad hoc communications via a cellular network if the two users fall out of range of the open broadcasting communication protocol.

Figure 1:
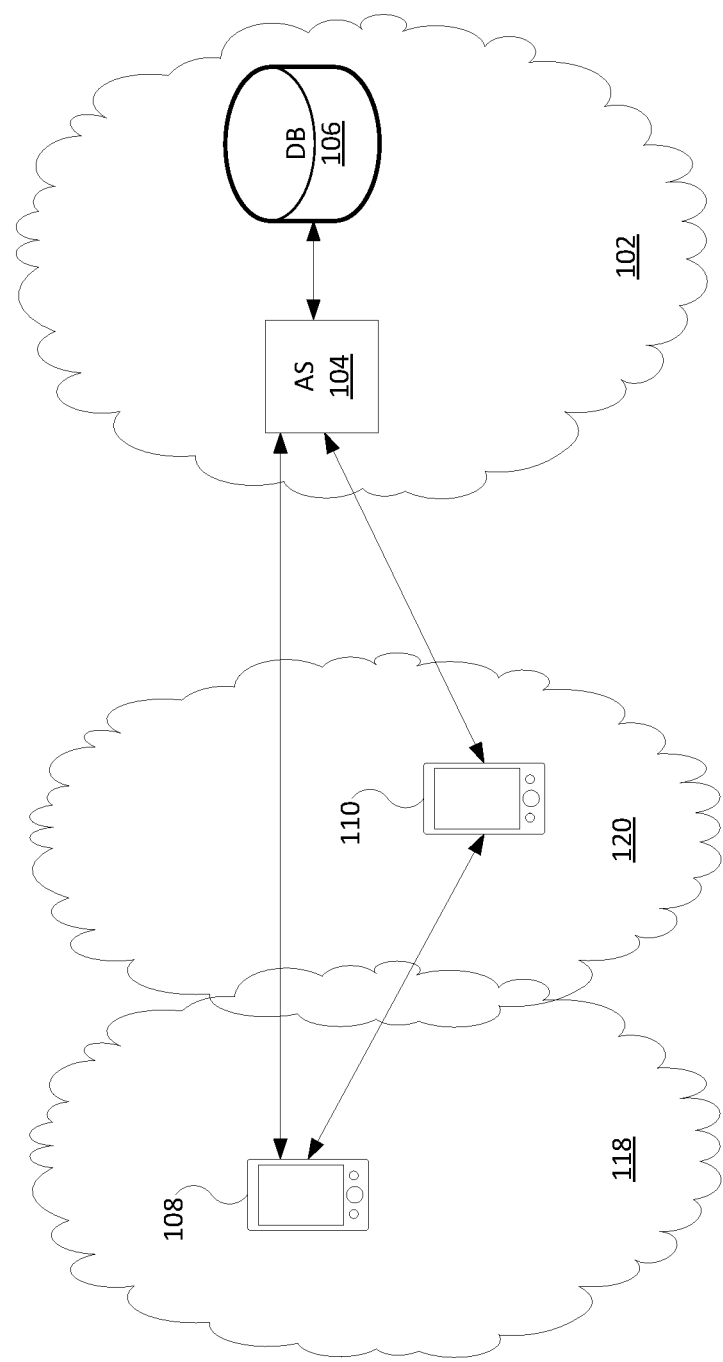
FIG. 1 illustrates one example of a communications network of the present disclosure.

FIG. 1 is a block diagram depicting one example of a communications network 100. For example, the communication network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

Figure 5:
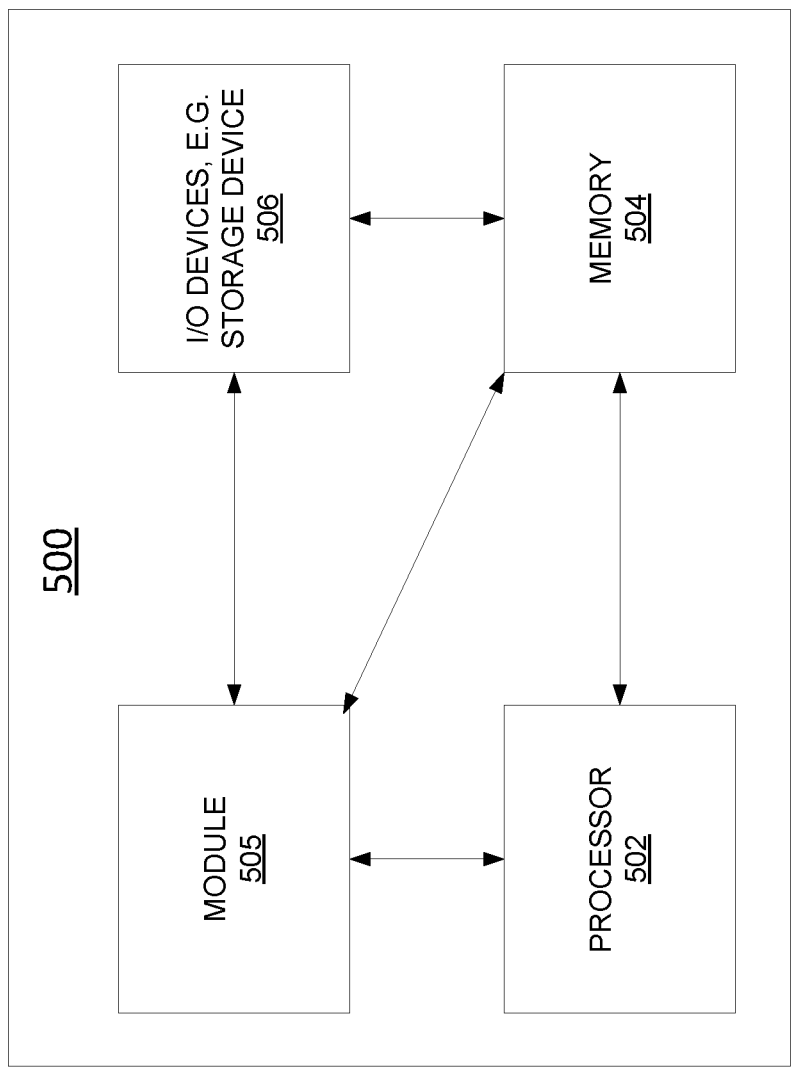
FIG. 5 illustrates a high-level block diagram of a general-purpose computer suitable for use in performing the functions described herein.

In one embodiment, the communications network 100 may include a core network 102. The core network 102 may include an application server (AS) 104 and a database (DB) 106. The AS 104 may be deployed as a hardware device embodied as a general purpose computer (e.g., the general purpose computer 500 as illustrated in FIG. 5). In one embodiment, the AS 104 may perform the methods and functions described herein (e.g., the method 200 discussed below).

In one embodiment, the AS 104 may perform various functions or operations as described herein, for example, the authentication of a sender endpoint device and establishing a cellular network connection if two endpoints fall out of range of the open communications protocol, and the like. In one embodiment, the DB 106 may store subscriber information (e.g., the subscriber's contact information, the subscriber's mobile endpoint telephone number, stored authentication token information, subscriber filters and the like.

In one embodiment, the communications network may include one or more access networks (e.g., a cellular network, a wireless network, a wireless-fidelity (Wi-Fi) network, a PSTN network, an IP network, and the like) that are not shown to simplify FIG. 1. In one embodiment, the communications network 100 in FIG. 1 is simplified and it should be noted the communications network 100 may also include additional network elements (not shown), such as for example, border elements, gateways, firewalls, routers, switches, call control elements, various application servers, and the like.

In one embodiment, the communications network 100 may include mobile endpoint devices 108 and 110. Although only two mobile endpoint devices are illustrated in FIG. 1, it should be noted that any number of mobile endpoint devices may be deployed. In one embodiment, the mobile endpoint device may be any mobile endpoint device, such as for example, a smart phone, a cellular telephone, a computing tablet, any mobile computing device having open communications protocol capability, and the like.

In one embodiment, the mobile endpoint device 108 may be referred to as a sender, a sender mobile endpoint device, a sender device, and the like. In one embodiment, the mobile endpoint device 110 may be referred to as a recipient, a recipient mobile endpoint device, a recipient device, and the like. In one embodiment, the users of the mobile endpoint devices 108 and 110 may each also be a subscriber of a service provider of the communications network 100 that may provide cellular network communications services.

In one embodiment, the mobile endpoint devices 108 and 110 may also communicate over an open communications protocol, such as for example, Bluetooth®, Zigbee®, near field communications protocol, other RF communications, Wi-Fi, infrared communications (e.g., IrDA), and the like. In one embodiment, the open communications protocol may provide a personal communication area network having a range 118 for the mobile endpoint device 108 and the personal communication area having a range 120 for the mobile endpoint device 110.

In one embodiment, the mobile endpoint devices 108 and 110 may subscribe to services for establishing ad hoc communications with unknown contacts provided by a service provider of the communications network 100. In one embodiment, the mobile endpoint device 108 may be the sending device and has signed up for an authentication token with the service provider of the communications network 100. In one embodiment, the authentication token is stored on the mobile endpoint device 108 and in the DB 106.

In one embodiment, the mobile endpoint device 108 may also consent to being traceable, i.e., consenting to be identified if necessary or appropriate. For example, if the mobile endpoint device 108 is the sender device and is harassing the recipient device, or violating an end user agreement of the service provider, the service provider may provide the contact information of the user associated with the mobile endpoint device 108 (e.g., to the recipient device, to the proper authorities, and the like).

In one embodiment, the mobile endpoint device 110 may be the recipient device. In one embodiment, the mobile endpoint device 110 may pre-define one or more message filters. The one or more message filters allow the mobile endpoint device 110 to control what messages are received from unknown contacts. For example, the filters may specify that the mobile endpoint device 110 only wants to receive messages about safety issues, only wants to receive messages that provide a telephone number of the sender, and the like.

The one or more message filters may also include publicly available information that may identify the user of the mobile endpoint device 110. For example, the publicly available information may include a general description of the user (e.g., Caucasian with short brown hair, tall Asian male with short black hair, etc.), a general description of the cars the user drives (e.g., Silver 2010 Honda Accord, Blue Ford F210 pick up truck, etc.). In one embodiment, the description of the user may be changed daily by the user to include a brief description of what the user is wearing (e.g., blue sweater and blue jeans, white polo and khaki trousers, and the like). The publicly available information may be used to allow an unknown contact to direct a message toward the recipient mobile endpoint device 110 as will be discussed below.

In one embodiment, a user of the mobile endpoint device 108 may be driving up behind a vehicle being driven by a user of the mobile endpoint device 110. The user of the mobile endpoint device 108 may see an item in danger of falling out of the trunk of the vehicle driven by the user of the mobile endpoint device 110. The user of the mobile endpoint device 108 may want to send the mobile endpoint device 110 a message to warn him or her about the safety issue. However, the user of the mobile endpoint device 108 may not know the user of the mobile endpoint device 110. In other words, the user of the mobile endpoint device 110 is an unknown contact to the user of the mobile endpoint device 108.

In one embodiment, the range 118 of the open communications protocol of the mobile endpoint device 108 may be within the range 120 of the open communications protocol of the mobile endpoint device 110. For example, in FIG. 1, the open communications protocol coverage area of 118 and 120 overlap so that the two mobile endpoint devices may communicate directly with each other (e.g., device to device communication such as Bluetooth® or near field communication) without the need to access a network service such as cellular service or Wi-Fi service. For example, the mobile endpoint device 108 may detect that the mobile endpoint device 110 is within range and available to receive a message.

In one embodiment, a general message may be broadcast by the mobile endpoint device 108. The message may be received by any endpoint device (e.g., the mobile endpoint device 110) within the open communications protocol coverage area of the mobile endpoint device 108 and an assumption that the mobile endpoint device 108 is a registered subscriber that can be identified may be used as an initial low level of authentication.

In another embodiment, the mobile endpoint device 108 may include a message with some publically available identification of the mobile endpoint device 110 as described above with respect to the one or more message filters. For example, the mobile endpoint device 108 may see a long blonde haired Caucasian woman wearing a red blouse and blue jeans that has dropped her hat. The mobile endpoint device 108 may include in a heading of a message "long blonde haired Caucasian woman wearing red blouse and blue jeans" and in a body of the message "you dropped your hat". As a result, the mobile endpoint device 110 may accept the message using the message filter that describes the user.

In another embodiment, the mobile endpoint device 110 may display a bar code or a public device name that can be used to identify which signal is associated with the mobile endpoint device 110. For example, a bar code may be placed on a bumper of a car and the mobile endpoint device 108 may scan the bar code and send a message to the mobile endpoint device 110 in the car using the open short range communications protocol.

In one embodiment, the first level of authentication may be based on the assumption that the mobile endpoint device 110 is a subscriber of a service provider that can be tracked. Thus, the mobile endpoint device 110 may respond immediately to the message using the initial authentication without the need for authentication from the AS 104 in the core network 102.

In another embodiment, the mobile endpoint device 110 may escalate the authentication before choosing to respond or continue the communications with the mobile endpoint device 108. For example, in one embodiment, the mobile endpoint device 108 may send a message and an authentication token to the mobile endpoint device 110 indicating that there is a potential safety issue. As noted above, the mobile endpoint device 110 could respond immediately. However, the mobile endpoint device 110 could escalate the authentication using the authentication token.

For example, the mobile endpoint device 110 may receive a notification that an unknown contact is attempting to send a message to the mobile endpoint device 110. In one embodiment, the mobile endpoint device 110 may send the received authentication token to the communications network service provider to verify that the authentication token is valid. In one embodiment, any authentication protocol may be used to perform the authentication (e.g., Open ID, OAUTH, and the like). For example, the communications network service provider may verify that the sending device is a traceable subscriber, i.e., a subscriber who can be identified and/or authenticated. Notably, the authentication is performed on-line.

In one embodiment, if the sending device is authenticated, the mobile endpoint device 110 may apply a message filter. For example, since the message is related to a safety message the mobile endpoint device 110 may wish to establish an ad hoc communication with the mobile endpoint device 108 immediately via the open communications protocol.

In another embodiment, the mobile endpoint device 110 may not be satisfied with the level of authentication provided by the authentication token. As a result, the mobile endpoint device 110 may request an additional level of authentication. For example, the next level authentication may be to provide a telephone number of the mobile endpoint device 108. If the telephone number does not satisfy the level of authentication required by the mobile endpoint device 110, the mobile endpoint device 108 may send a name of the user of the mobile endpoint device 108, and so forth until a level of authentication is accepted by the mobile endpoint device 110.

In one embodiment, the vehicles may drift apart with one another such that the ranges 118 and 120 of the open communications protocol coverage area of the mobile endpoint devices 108 and 110 no longer overlap. As a result, either the mobile endpoint device 108 or the mobile endpoint device 110 may request to the communications network 100 to continue the ad hoc communication over an access network, e.g., the cellular network, of the communications network 100.

In one embodiment, the mobile endpoint device 110 may send a request to the communications network 100 to continue the ad hoc communication. The AS 104 may send a one-time use telephone number to the mobile endpoint device 108 such that the identity and contact information of the mobile endpoint device 110 remain unknown to the user of the mobile endpoint device 108. The mobile endpoint device 108 may continue the ad hoc communication by calling the one-time use telephone number and the communications network (e.g., the AS 104) may establish a cellular network connection between the mobile endpoint device 108 and the mobile endpoint device 110. In one embodiment, the one-time use telephone number may be available for a pre-defined period of time (e.g., 1 hour, 1 day, and the like).

In another embodiment, the AS 104 may call each of the mobile endpoint devices 108 and 110 while blocking the caller identification number for anonymity, if needed. After both mobile endpoint devices 108 and 110 answer the call, the AS 104 may combine each call so the mobile endpoint devices 108 and 110 may have direct duplex communications. In other words, the mobile endpoint devices 108 and 110 may not need to dial the one-time user telephone number to continue communications.

In one embodiment, other forms of communications may be used to continue the communications when the mobile endpoint devices 108 and 110 fall out of range of the open communications protocol coverage area. For example, masked session initiation protocol (SIP) addresses or masked email addresses may be used to establish a two-way SIP communication session or an exchange of email messages.

In one embodiment, if the mobile endpoint device 108 violates a user agreement regarding the type of messaging that is allowed to be sent to the mobile endpoint device 110 (e.g., an offensive message, a harassing message or simply a large number of unwanted messages, and the like), the mobile endpoint device 110 may request the communications network service provider to provide contact information or identification of the user of the mobile endpoint device 108. In another embodiment, the contact information may be provided to a third party or authority (e.g., the police).

As a result, the embodiments of the present disclosure provide a method for two users who do not know one another to establish an ad hoc communication via an open communications protocol. Thus, users may provide various types of messages (e.g., a safety message, a warning message, a personal message, and the like) to an unknown contact.

Figure 2:
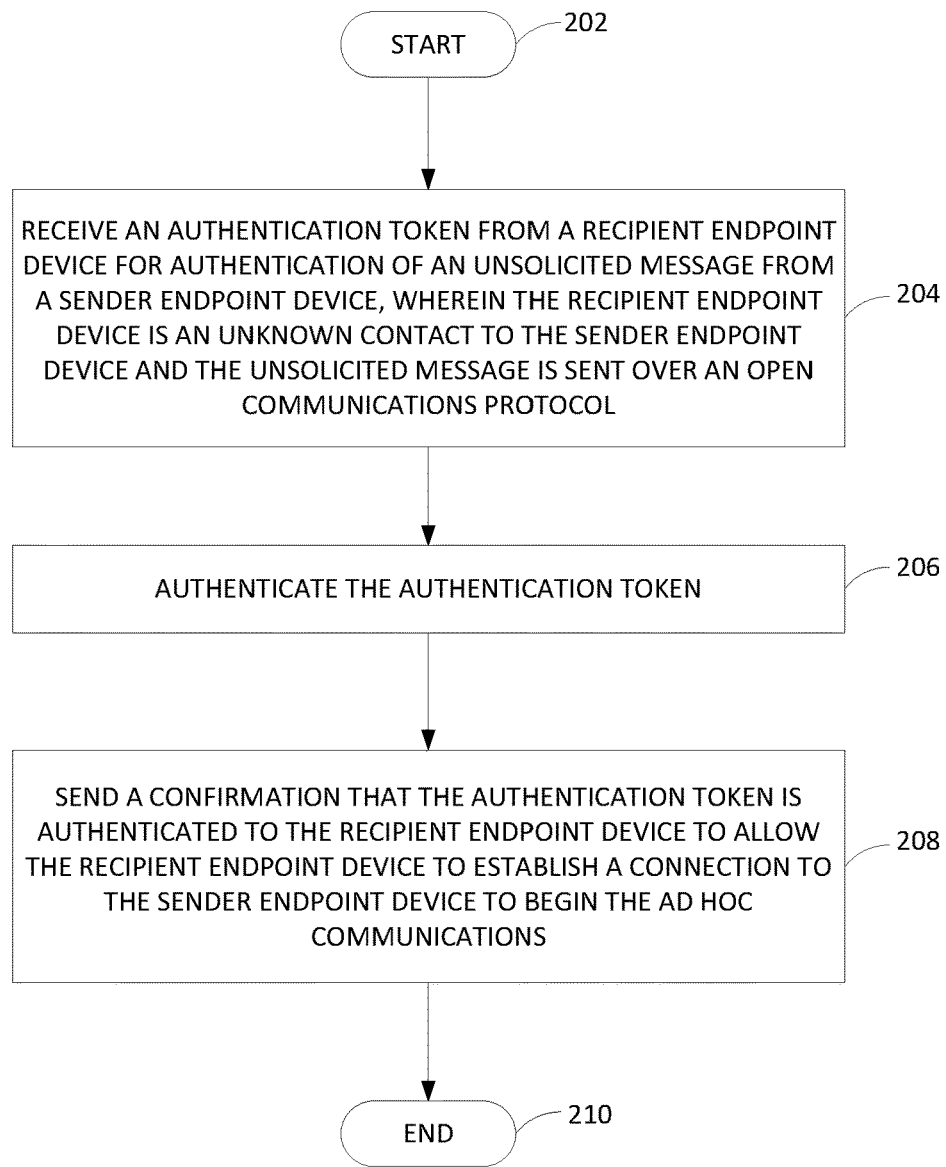
FIG. 2 illustrates an example flowchart of a method for establishing an ad hoc communications with an unknown contact.

FIG. 2 illustrates a flowchart of a method 200 for establishing an ad hoc communication with an unknown contact. In one embodiment, the method 200 may be performed by the AS 104 or a general purpose computer as illustrated in FIG. 5 and discussed below.

The method 200 begins at step 202. At step 204, the method 200 receives an authentication token from a recipient endpoint device for authentication of an unsolicited message received from a sender endpoint device, wherein the recipient endpoint device is an unknown contact to the sender endpoint device and the unsolicited message is sent over an open communications protocol.

For example, the user of the sender device may see a safety issue related to a vehicle being driven by the user of the recipient device. However, the user of the recipient device may be an unknown contact relative to the user of the sender device. Both the sender device and the recipient device may pre-register with the service provider of the communication network to subscribe to an ad hoc communication service with unknown contacts.

In one scenario, the sender device may come within range of the recipient device to allow broadcasting of a signal using an open communications protocol (e.g., Bluetooth®, ZigBee®, near field communications other RF communications, Wi-Fi, infrared communications (e.g., IrDA), and the like). The sender device may then send a pre-defined message or a personal message to the recipient device with an authentication. In one embodiment, the authentication may be an authentication token that was obtained in advance during the registration with the service provider of the communications network.

At step 206, the method 200 authenticates the authentication token. In one embodiment, the authentication token may be received from the recipient device that was received from the sender device for verification. Any type of authentication communications protocol may be used for the authentication (e.g., Open ID, OAUTH, and the like). In one embodiment, the AS in the communications network may compare the credentials of the authentication token with a copy of the authentication token stored in the DB 106.

At step 208, the method 200 sends a confirmation that the authentication token is authenticated to the recipient endpoint device to allow the recipient endpoint device to establish a connection to the sender endpoint device to begin the ad hoc communication. In one embodiment, if the credentials of the authentication token match the credentials of the authentication token stored in the DB, then the communications network may confirm that the sender device is authenticated and send the recipient device a confirmation message. The recipient device may then establish an ad hoc communication with the sender device. The method 200 ends at step 210.

Figure 3:
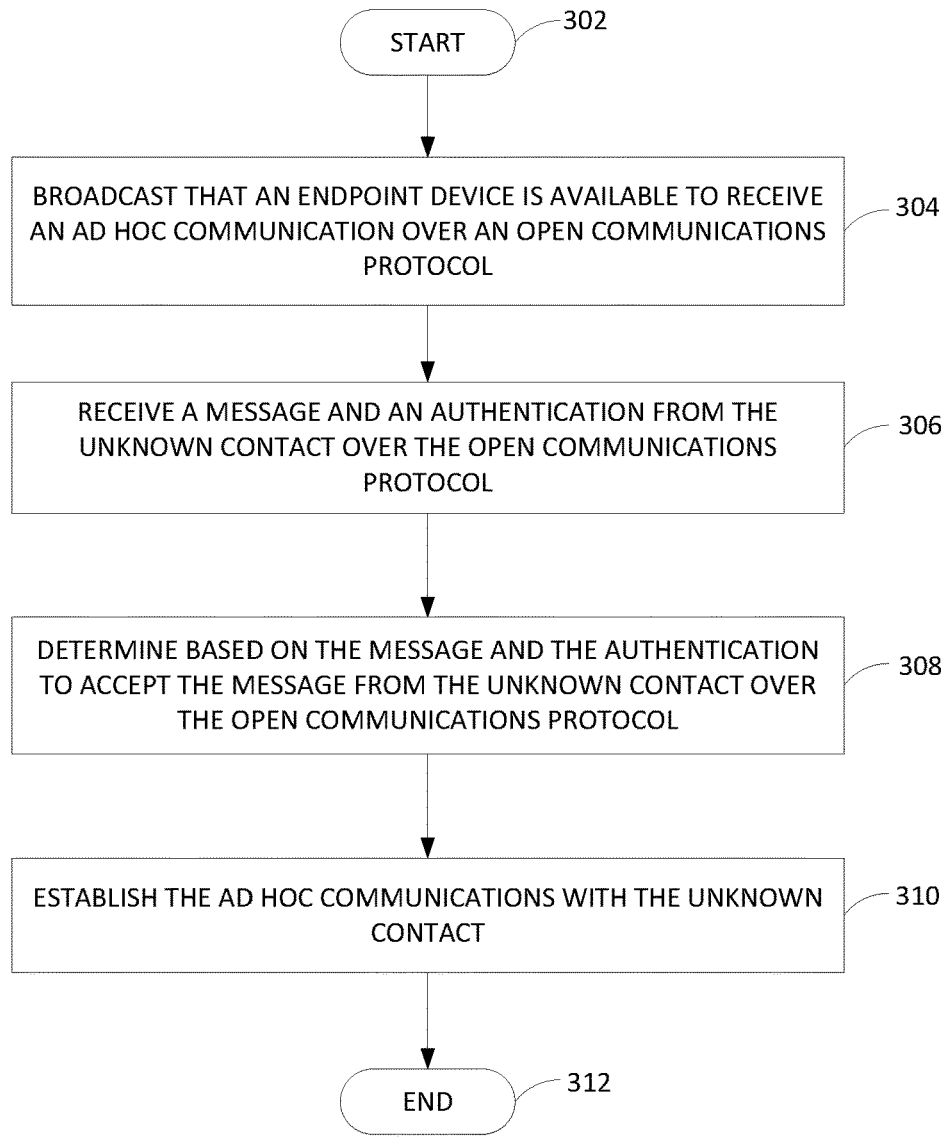
FIG. 3 illustrates another example flowchart of a method for establishing an ad hoc communications with an unknown contact.

FIG. 3 illustrates a flowchart of a method 300 for establishing an ad hoc communications with an unknown contact. In one embodiment, the method 300 may be performed by the recipient endpoint device or a general purpose computer as illustrated in FIG. 5 and discussed below.

The method 300 begins at step 302. At step 304, the method 300 broadcasts that an endpoint device is available to receive an ad hoc communication over an open communication protocol. For example, using an open communications protocol, such as for example, Bluetooth®, Zigbee®, near field communications other RF communications, Wi-Fi, infrared communications (e.g., IrDA), and the like, the recipient device may send a signal indicating that the recipient device is currently open to receiving messages from unknown contacts.

At step 306, the method 300 receives a message and an authentication from an unknown contact over the open communications protocol. In one embodiment, a sending device may identify the recipient device from publicly available information (e.g., a description of a user of the recipient device or a car driven by the user of the recipient device) and send the message and the authentication to the recipient device over the open communications protocol.

In one embodiment, the message may be a pre-defined message. For example, the messages may be a general pre-written message in one of a plurality of different categories. For example, the categories could include safety, greeting, warning, and the like. In another embodiment, the message may be a personalized message.

At step 308, the method 300 determines based on the message and the authentication to accept the message from the unknown contact over the open communications protocol. In one embodiment, the authentication may be an authentication token. The authentication token may be sent to the communications network for verification using any type of authentication protocol (e.g., Open ID, OAUTH, and the like).

In another embodiment, the recipient device may require additional authentication. For example, the authentication token may only signify that the sending device is a traceable subscriber of the service provider communications network. However, the recipient device may want more authentication credentials before receiving the message for display. For example, the recipient device may require a contact user name. The authentication request may continue to escalate between the sender device and the recipient device until the recipient device obtains a desired level of authentication.

In one embodiment, a message filter may be applied to the message. For example, the message filter may make sure that the received message is intended for the recipient based upon an included description in a header of the message. In addition, the message filter may specify that the recipient device may only want a pre-defined message and no personal messages. As a result, if the message is a personalized message the message may not be accepted even if the sender device is authenticated.

At step 310, the method 300 establishes the ad hoc communication with the unknown contact. For example, if the sender device is authenticated and the message filter does not filter out the incoming message, the recipient device may establish the ad hoc communication with the unknown contact using the open communications protocol.

In one embodiment, if the recipient device moves out of range of the open communications protocol from the sender device, the recipient device may send a request to the communications network to continue the ad hoc communication using a cellular network of the communications network service provider. The communications network may establish the cellular network connection knowing the mobile telephone number of the sender device and the recipient device and may also provide a one-time disposable or temporary telephone number to the sender device and the recipient device. The one-time disposable or temporary telephone number may be provided to allow the sender device and the recipient device to remain unknown or anomalous to each other. The method 300 ends at step 312.

Figure 4:
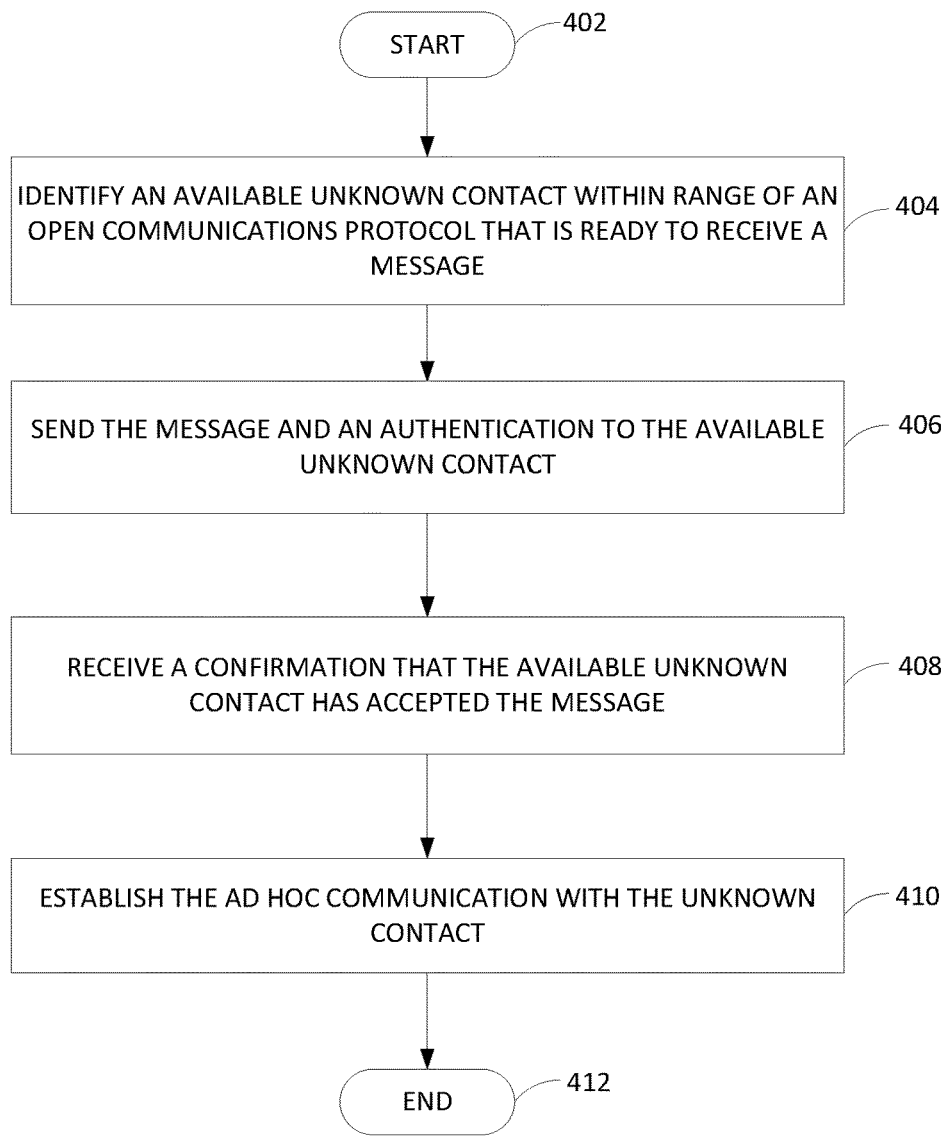
FIG. 4 illustrates yet another example flowchart of a method for establishing an ad hoc communications with an unknown contact.

FIG. 4 illustrates a flowchart of a method 400 for establishing an ad hoc communication with an unknown contact. In one embodiment, the method 400 may be performed by the sending endpoint device or a general purpose computer as illustrated in FIG. 5 and discussed below.

The method 400 begins at step 402. At step 404, the method identifies an available unknown contact within range of an open communications protocol that is ready to receive a message. For example, using an open communications protocol, such as for example, Bluetooth®, Zigbee®, near field communications other RF communications, Wi-Fi, infrared communications (e.g., IrDA), and the like, the recipient device may send a signal indicating that the recipient device is open to receiving messages from unknown contacts.

At step 406, the method 400 sends a message and an authentication to the available unknown contact. In one embodiment, a sending device may identify the recipient device from publicly available information (e.g., a description of a user of the recipient device or a car driven by the user of the recipient device) and send the message and the authentication to the recipient device over the open communications protocol. In one embodiment, the authentication may be an authentication token. The authentication token may be subsequently sent to the communications network for verification by the recipient device.

In one embodiment, the message may be a pre-defined message. For example, the messages may be a general pre-written message in one of a plurality of different categories. For example, the categories could include safety, greeting, warning, and the like. In another embodiment, the message may be a personalized message.

In another embodiment, the recipient device may require additional authentication. For example, the authentication token may only signify that the sending device is a traceable subscriber of the service provider communications network. However, the recipient device may want more authentication credentials before receiving the message. For example, the recipient device may require a contact user name. The authentication requests may continue to escalate between the sender device and the recipient device until the recipient device obtains a desired level of authentication.

At step 408, the method 400 receives a confirmation that the available unknown contact has accepted the message. For example, if the authentication sent by the sender device is verified by the communications network, the message is identified as a message intended for the recipient device based upon a description in a header of the mesage and the message is an acceptable type of message based upon a message filter of the recipient device, the sender device may receive a confirmation from the recipient device that the message is accepted or being accepted by the recipient device.

At step 410, the method 400 establishes the ad hoc communication with the unknown contact. For example, if the sender device is authenticated and the message filter does not filter out the incoming message, the sender device may establish the ad hoc communication with the unknown contact using the open communications protocol.

In one embodiment, if the sender device moves out of range of the open communications protocol with the recipient device, the sender device may send a request to the communications network to continue the ad hoc communication using a cellular network of the communications network service provider. The communications network may establish the cellular network connection knowing the mobile telephone number of the sender device and the recipient device and may also provide a one-time disposable or temporary telephone number to the sender device and the recipient device. The one-time disposable or temporary telephone number may be provided to allow the sender device and the recipient device to remain unknown to each other, thereby protecting the privacy of both parties. The method 400 ends at step 412.

It should be noted that although not explicitly specified, one or more steps or operations of the methods 200-400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIGS. 2-4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for establishing an ad hoc communication with an unknown contact, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for establishing an ad hoc communication with an unknown contact (e.g., a software program comprising computer-executable instructions) can be loaded into memory 504 and executed by hardware processor element 502 to implement the steps, functions or operations as discussed above in connection with the exemplary methods 200-400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for establishing an ad hoc communication with an unknown contact (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method, comprising:

receiving, by a server, an anonymous communication request sent from a mobile device, the anonymous communication request requesting an anonymous communication between the mobile device and an unknown contact at a different mobile device, wherein the receiving the anonymous communication request is responsive to an ad hoc communication session, previously established between the mobile device and the different mobile device, being impacted due to a distance between the mobile device and the different mobile device exceeding a coverage range of an open short range communication protocol of the ad hoc communication session, and wherein the ad hoc communication session is previously established between the mobile device and the different mobile device based on an unsolicited message transmitted from the different mobile device to the mobile device;

assigning, by the server, a one-time use telephone number to the anonymous communication between the mobile device and the different mobile device; and sending, by the server, the one-time use telephone number to the mobile device, wherein the sending the one-time use telephone number to the mobile device enables the mobile device to initiate the anonymous communication over a cellular network as a continuation of the ad hoc communication session with the different mobile device, wherein the ad hoc communication session is previously established while maintaining anonymity of a user of the mobile device, wherein the unsolicited message includes first information identifying a vehicle of the user of the mobile device or second information identifying a physical description of the user of the mobile device, and wherein the one-time use telephone number enables the mobile device to initiate the anonymous communication while maintaining anonymity of the unknown contact at the different mobile device.

2. The method of claim 1, further comprising determining a name associated with the mobile device.

3. The method of claim 1, further comprising determining a name associated with the mobile device or the different mobile device.

4. The method of claim 1, further comprising determining a name associated with the unknown contact.

5. The method of claim 1, further comprising receiving an identifier associated with the different mobile device.

6. The method of claim 1, further comprising receiving an identifier associated with the mobile device.

7. The method of claim 1, further comprising receiving an identifier associated with the unknown contact.

8. A system, comprising:

a hardware processor; and a memory device, the memory device storing instructions, the instructions when executed causing the hardware processor to perform operations, the operations comprising:

receiving an anonymous communication request sent from a mobile device, the anonymous communication request requesting an anonymous communication between the mobile device and an unknown contact at a different mobile device, wherein the receiving the anonymous communication request is responsive to an ad hoc communication session, previously established between the mobile device and the different mobile device, being impacted due to a distance between the mobile device and the different mobile device exceeding a coverage range of an open short range communication protocol of the ad hoc communication session, and wherein the ad hoc communication session is previously established between the mobile device and the different mobile device based on an unsolicited message transmitted from the different mobile device to the mobile device;

assigning a one-time use mobile number to the different mobile device; and sending the one-time use mobile number to the mobile device, wherein the sending the one-time use mobile number to the mobile device enables the mobile device to initiate the anonymous communication with the unknown contact at the different mobile device over a cellular network as a continuation of the ad hoc communication session with the different mobile device, wherein the ad hoc communication session is previously established while maintaining anonymity of a user of the mobile device, wherein the unsolicited message includes first information identifying a vehicle of the user of the mobile device or second information identifying a physical description of the user of the mobile device, and wherein the one-time use mobile number enables the mobile device to initiate the anonymous communication while maintaining anonymity of the unknown contact at the different mobile device.

9. The system of claim 8, wherein the operations further comprise determining a name associated with the mobile device.

10. The system of claim 8, wherein the operations further comprise determining a name associated with the mobile device or the different mobile device.

11. The system of claim 8, wherein the operations further comprise determining a name associated with the unknown contact.

12. The system of claim 8, wherein the operations further comprise receiving an identifier associated with the different mobile device.

13. The system of claim 8, wherein the operations further comprise receiving an identifier associated with the mobile device.

14. The system of claim 8, wherein the operations further comprise receiving an identifier associated with the unknown contact.

15. A memory device storing instructions that when executed cause a hardware processor to perform operations, the operations comprising:

receiving an anonymous communication request requesting an anonymous communication between a mobile device and an unknown contact at a different mobile device, wherein the receiving the anonymous communication request is responsive to an ad hoc communication session, previously established between the mobile device and the different mobile device, being impacted due to a distance between the mobile device and the different mobile device exceeding a coverage range of an open short range communication protocol of the ad hoc communication session, and wherein the ad hoc communication session is previously established between the mobile device and the different mobile device based on an unsolicited message transmitted from the different mobile device to the mobile device;

assigning a one-time use mobile number to the anonymous communication between the mobile device and the different mobile device; and sending the one-time use mobile number to the mobile device, wherein the sending the one-time use mobile number to the mobile device enables the mobile device to initiate the anonymous communication with the unknown contact at the different mobile device over a cellular network as a continuation of the ad hoc communication session with the different mobile device, wherein the ad hoc communication session is previously established while maintaining anonymity of a user of the mobile device, wherein the unsolicited message includes first information identifying a vehicle of the user of the mobile device or second information identifying a physical description of the user of the mobile device, and wherein the one-time use mobile number enables the mobile device to initiate the anonymous communication while maintaining anonymity of the unknown contact at the different mobile device.

16. The memory device of claim 15, wherein the operations further comprise determining a name associated with the different mobile device.

17. The memory device of claim 15, wherein the operations further comprise determining a name associated with the different mobile device or the unknown contact.

18. The memory device of claim 15, wherein the operations further comprise receiving an identifier associated with the different mobile device.

19. The memory device of claim 15, wherein the operations further comprise receiving an identifier associated with the mobile device.

20. The memory device of claim 15, wherein the operations further comprise receiving an identifier associated with the unknown contact.

* * * * *